_United States Patent Office_

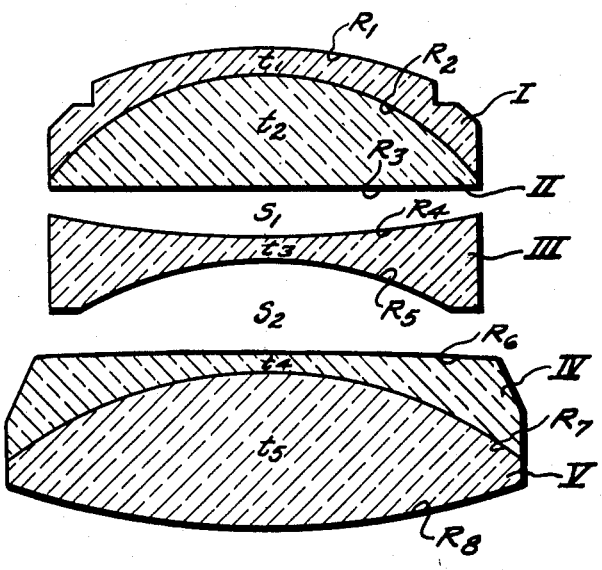
INVENTOR.
JAMES G. BAKER

2,900,871
Patented Aug. 25, 1959

2,900,871

MAGNIFIER

James G. Baker, Winchester, Mass., assignor to the United States of America as represented by the Secretary of the Air Force Application March 12, 1958, Serial No. 721,074

1 Claim. (Cl. 88—57)

The present invention relates generally to magnifiers of wide covering power and good definition and, as illustrated herein, relates more particularly to the use of such magnifiers in stereoscopes.

Various types of magnifiers are found in the art. The simplest magnifiers consist of one or two elements, corrected for a small external pupil and, in some cases, for astigmatism and distortion. Magnifiers usually are related to eyepieces used in visual optical instruments. These eyepieces usually have an external, accessible pupil location where the eye may be placed for the purpose of seeing a large real field. In other words, the eye is located at the exit pupil of the optical instrument regardless of its complexity. In the case of the eyepiece, only the rays passing through this well defined exit pupil need be corrected. With such a small aperture, the system need only be corrected for astigmatism, field curvature and distortion, and for lateral color. Spherical aberration, coma and longitudinal chromatic aberrations are normally present but the eye selects so small a portion of the possible rays passing through the eyepiece that these aberrations ordinarily are not significant and hence need not be corrected for such aberrations.

In the case of a magnifier, the object plane is illuminated by light from all directions and there is no well defined pupil or stop, except the one defined broadly by the magnifier itself. There is no preceding optical instrument for collecting and focusing rays along desirable paths. In such magnifiers, the eye may still be placed at a position along the optical axis external to the magnifier which would be substantially identical with the stop used if the magnifier were employed as an eyepiece.

If the usual type eyepiece is used as a magnifier and is viewed with the eye in a position displaced either longitudinally or transversely thereof, the observer will see considerable amounts of distortion, astigmatism and color aberration. This situation will be particularly acute when the eye of the observer is off center at the edge of the bundle of rays transmitted by the eyepiece. Thus, as a rule, eyepieces which are sufficiently corrected for their own purposes usually prove to be inadequate when used as magnifiers.

However, in spite of the shortcomings of simple optical systems which have been designed as eyepieces, they are manufactured and distributed for use as magnifiers also. The observer simply accepts the difficulties and attempts to look through the part of the eyepiece which gives him the best results. In the case of stereoscopes, the situation is greatly aggravated. Here two eyes are involved and the observer's eyes may be looking through different portions at either side of the magnifier so that the aberrations will not only produce distortions but will blur the image and distort the stereoscopic effect as well.

In the average small stereoscope now on the market, only simple plano-convex elements are used. Such a lens form has some merit in that the amount of astigmatism is small and there is an accessible external location for the eye but it cannot be corrected for distortion nor, with simple elements, for either longitudinal or lateral color. Accordingly, users of standard stereoscopes now in common use must tolerate poor optical performance in the outer portion of the field of view transmitted by the single lens magnifiers.

One object of the present invention is to provide a magnifier for use in a stereoscope by the use of which the present difficulties will be overcome. To this end, the magnifier is designed as an optical system corrected for an accessible external pupil that would be free of spherical aberration, coma, astigmatism, curvature of field, distortion, and longitudinal and lateral color. This involves also designing a system that would be uniformly good over a large pupil. In such a system, all of the emergent rays are adequately corrected and it is unimportant between relatively wide limits where the observer's eyes are located either transversely or longitudinally above the magnifiers.

Another object of the invention is to improve generally upon the construction and operation of stereoscopic magnifiers.

With the above and other objects and features in view the invention will now be described with particular reference to the figure of the accompanying drawing in which is shown a lens system constructed according to the present invention.

The present invention is designed particularly for use in stereoscopic magnifiers whereby fine detail in stereoscopic maps or the like may be more easily and conveniently studied. The rays entering the observer's eyes are so well corrected that he has no feeling that his vision is impaired at all. Accordingly, there is no eyestrain such as is usually associated with stereoscopic viewing and the observer's eyes are just as much at home in the new image space as they would be for viewing under normal circumstances without optical aid.

The magnifiers concerned here are capable of giving overlapping fields of view measuring 2½ inches laterally and 5 inches longitudinally. In other words, the observer is enabled to obtain stereoscopic viewing at 2× over a 2½ by 5 inch photograph. The magnifier operates at a relative aperture of approximately $f/3.85$ and a field angle of about 45°. Over this entire field, there is no obvious distortion or blurring of the image. The observer may hold his head well above the magnifiers without facing the necessity of gluing his eyes to the stereoscope as would normally be the case. The observer may also focus the magnifiers so that the apparent image lies coincident with the top of his desk. This enables the observer to look through the magnifier or to make notes without need to refocus or change the convergence of his eyes.

The optical system of the present 2× magnifier resembles a photographic objective comprising three components, the first and third of which are cemented doublets between which is located an air spaced central simple component. Normally, the outermost elements in such a system, namely, elements I and V, are positive with negative elements cemented to them. The central element is usually bi-concave. The present system is designed to be uniformly good over a pupil as large as 1.3 inches in diameter.

The order of the elements, for the doublet nearest the eye has been reversed so that element I is formed of crown glass and element II is formed of flint glass. This was desirable since a magnifier undergoes frequent handling and cleaning. Thus it is important that element nearest the eye be made of as hard a glass as possible to reduce scratching or marking of the element I to a minimum.

It is important that the optical glasses used should be water white. The eye is sensitive to minor coloration, even though percentage wise, there is little loss of light in the blue and violet portion of the spectrum. Even slight coloration would make a piece of white paper appear darkish. On the other hand, it is important for purposes of obtaining shallow curvatures and reduced optical aberrations that glasses having rather high indices of refraction should be used to obtain a large fully corrected field of view. The present system illustrated in the drawing is believed to be the best compromise possible between these opposing requirements. The high index elements used for the positive elements have been carefully selected from among many types to be especially clear and free from coloration. The other elements offer no problem in this respect.

The following table illustrates by way of example, an embodiment of the objectives of the present invention which shows an astigmatically flattened image field of view, excellent correction for coma, spherical and both lateral and longitudinal chromatic aberration together with a large external pupil which permits convenient and comfortable use of the magnifier with a minimum of distortion.

In accordance with the drawing, the radii of curvature of the lens surfaces are denoted $R_1$, $R_2$, $R_3$, $R_4$, $R_5$, $R_6$, $R_7$, and $R_8$. The axial thickness of the lenses is indicated by $t_1$, $t_2$, $t_3$, $t_4$, and $t_5$ and the distances between the central component and the outer components is indicated by $S_1$ and $S_2$. The lenses are denoted by I, II, III, IV and V. The glasses used are indicated by the index and the Abbe number $v$. The mean refraction indices for light at the D line are denoted $n_1$, $n_2$, $n_3$, $n_4$, and $n_5$, respectively.

A focal length of five inches has been assumed for the objective shown in the drawings.

*Example*

| Lens | Radii | Thickness | $n_D$ | $v$ |
|---|---|---|---|---|
| I | $R_1=1.825$ | $t_1=.085$ | $n_1=1.523$ | 58.6 |
| | $R_2=1.060$ | | | |
| II | | $t_2=.445$ | $n_2=1.642$ | 58.1 |
| | $R_3=$plano | $S_1=0.160$ | | |
| III | $R_4=4.205$ | $t_3=0.080$ | $n_3=1.596$ | 39.7 |
| | $R_5=1.455$ | $S_2=0.360$ | | |
| | $R_6=20.40$ | | | |
| IV | $R_7=1.635$ | $t_4=0.085$ | $n_4=1.583$ | 46.5 |
| V | $R_8=-3.155$ | $t_5=0.595$ | $n_5=1.678$ | 55.5 |

Having thus described my invention what I claim as new and desire to secure by Letters Patent of the United States is:

A lens system corrected for spherical and chromatic aberrations, coma, astigmatism and curvature of field comprising three air spaced components in optical alinement with each other, the end components being of positive power and the intermediate component being negative, said lens system being constructed according to the numerical data given in the table herebelow in which $R_1$ to $R_8$ designate the radii of the refractive surfaces of the lenses, starting at the front of the objective, $t_1$ to $t_5$ designate axial thicknesses of the respective lenses, $S_1$ and $S_2$ designate the axial spaces between the lenses, $n_D$ represents the index of refraction of the lens material for the D line of the spectrum and $v$ represents the dispersion of said lens material:

| Lens | Radii | Thickness | $n_D$ | $v$ |
|---|---|---|---|---|
| I | $R_1=1.825$ | $t_1=.085$ | $n_1=1.523$ | 58.6 |
| | $R_2=1.060$ | | | |
| II | | $t_2=.445$ | $n_2=1.642$ | 58.1 |
| | $R_3=$plano | $S_1=0.160$ | | |
| III | $R_4=4.205$ | $t_3=0.080$ | $n_3=1.596$ | 39.7 |
| | $R_5=1.455$ | $S_2=0.360$ | | |
| | $R_6=20.40$ | | | |
| IV | $R_7=1.635$ | $t_4=0.085$ | $n_4=1.583$ | 46.5 |
| V | $R_8=-3.155$ | $t_5=0.595$ | $n_5=1.678$ | 55.5 |

References Cited in the file of this patent
UNITED STATES PATENTS

| | | |
|---|---|---|
| 766,036 | Harting | July 26, 1904 |
| 2,279,384 | Altman | Apr. 14, 1942 |
| 2,336,301 | Schade et al. | Dec. 7, 1943 |
| 2,764,062 | Lange | Sept. 25, 1956 |